(12) United States Patent
Balduzzi et al.

(10) Patent No.: US 10,057,279 B1
(45) Date of Patent: Aug. 21, 2018

(54) SYSTEM AND METHOD FOR PROTECTING COMPUTER AGAINST REMOTE MALWARE DOWNLOADS

(71) Applicant: Trend Micro Incorporated, Tokyo (JP)

(72) Inventors: Marco Balduzzi, Bargamo (IT); Babak Rahbarinia, Montgomery, AL (US); Roberto Perdisci, Dacula, GA (US)

(73) Assignee: Trend Micro Incorporated, Tokyo (JP)

( * ) Notice: Subject to any disclaimer, the term of this patent is extended or adjusted under 35 U.S.C. 154(b) by 130 days.

(21) Appl. No.: 14/988,430

(22) Filed: Jan. 5, 2016

Related U.S. Application Data

(60) Provisional application No. 62/208,377, filed on Aug. 21, 2015, provisional application No. 62/261,709, filed on Dec. 1, 2015.

(51) Int. Cl.
*H04L 29/06* (2006.01)

(52) U.S. Cl.
CPC ........ *H04L 63/1416* (2013.01); *H04L 63/145* (2013.01)

(58) Field of Classification Search
USPC ..................................................... 726/23–25
See application file for complete search history.

(56) References Cited

U.S. PATENT DOCUMENTS

| | | | |
|---|---|---|---|
| 8,959,643 B1 * | 2/2015 | Invernizzi | H04L 63/1425 713/187 |
| 2007/0038681 A1 * | 2/2007 | Pierce | G06F 11/1469 |
| 2010/0186088 A1 * | 7/2010 | Banerjee | G06F 21/51 726/23 |
| 2011/0320387 A1 * | 12/2011 | He | G06N 99/005 706/12 |
| 2016/0350301 A1 * | 12/2016 | Tripathy | G06F 17/2705 |

OTHER PUBLICATIONS

Server Side Detection of Content Sniffing Attacks, Barua et al, IEEE, 2012 (Year: 2012).*
Drive-by Downloads Defense Based on Kernel Level Filtering, Li et al, IEEE 2012 (Year: 2012).*

(Continued)

*Primary Examiner* — Jahangir Kabir
(74) *Attorney, Agent, or Firm* — Okamoto & Benedicto LLP

(57) ABSTRACT

A system for protecting computers against remote malware downloads includes a malware download detection system and participating client computers that provide download event information to the malware download detection system. A download event information identifies a file, a network address (e.g., uniform resource locator) from which the file was downloaded, and an identifier of the client computer that downloaded the file. The malware download detection system uses the download event information to build and update a tripartite download graph, and uses the download graph to train one or more classifiers. The malware download detection system consults the one or more classifiers to classify a download event. The download event is classified as malicious if either the file or the network address is classified as malicious.

12 Claims, 12 Drawing Sheets

(56) References Cited

OTHER PUBLICATIONS

Acar Tamersoy, et al. "Guilt by Association: Large Scale Malware Detection by Mining File-relation Graphs", 10 pages [retrieved on Apr. 20, 2016], retrieved from the internet: https://www.cc.gatech.edu/~dchau/papers/14_kdd_aesop.pdf.

Moheeb Abu Rajab, et al. "CAMP: Content-Agnostic Malware Protection", 15 pages [retrieved on Apr. 20, 2016], retrieved from the internet: https://www.cs.jhu.edu/~moheeb/aburajab-ndss-13.pdf.

Manos Antonakakis, et al. "Building a Dynamic Reputation System for DNS", 17 pages [retrieved on Apr. 20, 2016], retrieved from the internet: https://www.usenix.org/event/sec10/tech/full_papers/Antonakakis.pdf.

Heng Yin, et al. "Panorama: Capturing System-wide Information Flow for Malware Detection and Analysis", 12 pages [retrieved on Apr. 20, 2016], retrieved from the internet: https://www.bitblaze.cs.berkeley.edu/papers/panorama.pdf.

Carsten Willems, et al. "Toward Automated Dynamic Malware Analysis Using CWSandbox", 8 pages [retrieved on Apr. 20, 2016], retrieved from the internet: https://www.ei.rub.de/media/emma/.../2012/12/14/CWSandbox-IEEESP2007.pdf.

Duen Horng Chau, et al. "Polonium: Tera-Scale Graph Mining for Malware Detection", 8 pages [retrieved on Apr. 20, 2016], retrieved from the internet: https://www.ml.cmu.edu/research/dap.../dap-chau.pdf.

Babak Rahbarinia, et al. "Segugio: Efficient Behavior—Based Tracking of Malware—Control Domains in Large ISP Network", Jun. 22-25, 2015, 12 pages, 45th Annual IEEE/IFIP International Conference on Dependable Systems and Networks.

Phani Vadrevu, et al. "Measuring and Detecting Malware Downloads in Live Network Traffic", 18 pages [retrieved on Apr. 20, 2016], retrieved from the internet: cobweb.cs.uga.edu/~kangli/src/esorics.pdf.

Wei-Jen Li, et al. "Fileprints: Identifying File Types by n-gram Analysis", Jun. 15-17, 2005, 8 pages, Proceedings from the Sixth Annual IEEE SMC Information Assurance Workshop.

Manos Antonakakis, et al. "Detecting Malware Domains at the Upper DNS Hierachy", 16 pages [retrieved on Apr. 20, 2016], retrieved from the internet: http://astrolavos.gatech.edu/articles/Kopis.pdf.

Leyla Bilge, et al. "Exposure: Finding Malicious Domains Using Passive DNS Analysis", 17 pages [retrieved on Apr. 20, 2016], retrieved from the internet: https://www.cs.ucsb.edu/~chris/research/doc/ndss11_exposure.pdf.

Luca Invernizzi, et al. "Nazca: Detecting Malware Distribution in Large-Scale Networks", 16 pages [retrieved on Apr. 20, 2016], retrieved from the internet: https://www.cs.ucsb.edu/~vigna/publications/2014_NDSS_Nazca.pdf.

Yanfang Ye, et al. "Combining File Content and File Relations for Cloud Based Malware Detection", 9 pages [retrieved on Apr. 20, 2016], retrieved from the internet: http://users.cis.fiu.edu/~taoli/pub/p222-malware.pdf.

Pratyusa K. Manadhata, et al. "Detecting Malicious Domains via Graph Inference", 21 pages [retrieved on Apr. 20, 2016], retrieved from the internet: http://esorics2014.pwr.wroc.pl/resources/abstracts/paper16.pdf.

Mark Felegyhazi, et al. "On the Potential of Proactive Domain Blacklisting", 8 pages [retrieved on Apr. 20, 2016], retrieved from the internet: https://www.usenix.org/event/leet10/tech/full_papers/Felegyhazi.pdf.

Leo Breiman "Random Forests", Jan. 2001, 33 pages, Abstract, Statistic Department, University of California Berkeley, CA.

Manos Antonakakis, et al. "From Throw-Away Traffic to Bots: Detecting the Rise of DGA-Based Malware", Aug. 8-10, 2012, 16 pages, 21st USENIX Security Symposium, Bellevue, WA.

J. Bergeron, et al. "Static Detection of Malicious Code in Executable Programs", 8 pages [retrieved on Apr. 20, 2016], retrieved from the internet: https://vxheaven.org/lib/pdf/Static%20Detection%20of%20Malicious%20Code%20in%20Executable%20Programs.pdf Fanglu Guo, et al. "A Study of the Packer Problem and Its Solutions", 18 pages [retrieved on Apr. 20, 2016], retrieved from the internet: http://www.ecsl.cs.sunysb.edu/tr/TR237.pdf.

Ulrich Bayer, et al. "TTAnalyze: A Tool for Analyzing Malware", 12 pages [retrieved on Apr. 20, 2016], retrieved from the internet: https://www.cs.ucsb.edu/~chris/research/doc/eicar06_ttanalyze.pdf.

Jon Oberheide, et al. "CloudAV: N-Version Antivirus in the Network Cloud", 16 pages [retrieved on Apr. 20, 2016], retrieved from the internet: http://www.eecs.umich.edu/fjgroup/pubs/cloudav-usenix08.pdf.

Norman SandBox Whitepaper, 2003, 19 pages [retrieved on Apr. 20, 2016], retrieved from the internet: http://repo.hackerzvoice.net/depot_madchat/vxdevl/papers/avers/03_sandbox.pdf.

\* cited by examiner

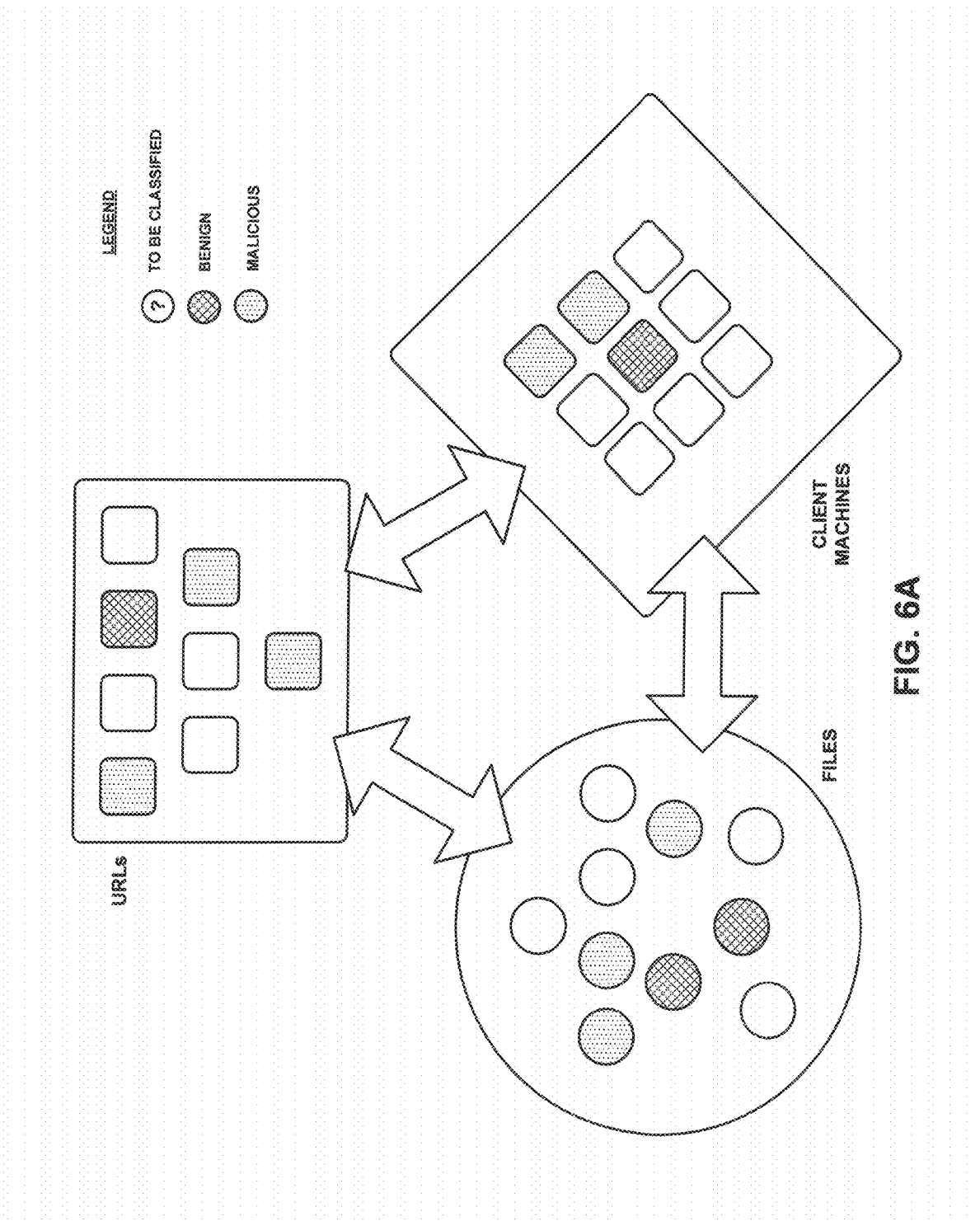

SYSTEM AND METHOD FOR PROTECTING COMPUTER AGAINST REMOTE MALWARE DOWNLOADS

CROSS-REFERENCE TO RELATED APPLICATIONS

The present application claims the benefit of U.S. Provisional Patent Application No. 62/208,377, filed on Aug. 21, 2015 and U.S. Provisional Patent Application No. 62/261,709, filed on Dec. 1, 2015, both of which are incorporated herein by reference in their entirety.

BACKGROUND OF THE INVENTION

1. Field of the Invention

The present invention relates generally to computer security, and more particularly but not exclusively to systems and methods for combating remote malware downloads.

2. Description of the Background Art

Remote malware downloads, e.g., via drive-by exploits, social engineering attacks, second-stage malware drops, etc., currently represent one of the most effective ways of infecting computers. Unfortunately, existing solutions for preventing malware downloads, such as antivirus scanning and uniform resource locator (URL) blacklists, are only partially effective because they tend to lag behind the latest threats, thus leaving client computers exposed to new malware infections. For example, antivirus scanning is relatively ineffective against malware code obfuscation, whereas URL blacklists can be circumvented by distributing malware downloads from frequently changing domains.

SUMMARY

In one embodiment, a system for protecting computers against remote malware downloads includes a malware download detection system and participating client computers that provide download event information to the malware download detection system. A download event information identifies a file, a network address (e.g., uniform resource locator) from which the file was downloaded, and an identifier of the client computer that downloaded the file. The malware download detection system uses the download event information to build and update a tripartite download graph, and uses the download graph to train one or more classifiers. The malware download detection system consults the one or more classifiers to classify a download event. The download event is classified as malicious if either the file or the network address is classified as malicious.

These and other features of the present invention will be readily apparent to persons of ordinary skill in the art upon reading the entirety of this disclosure, which includes the accompanying drawings and claims.

DESCRIPTION OF THE DRAWINGS

FIGS. 6A-6D graphically illustrate the relationships between nodes in a tripartite download graph in accordance with an embodiment of the present invention.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
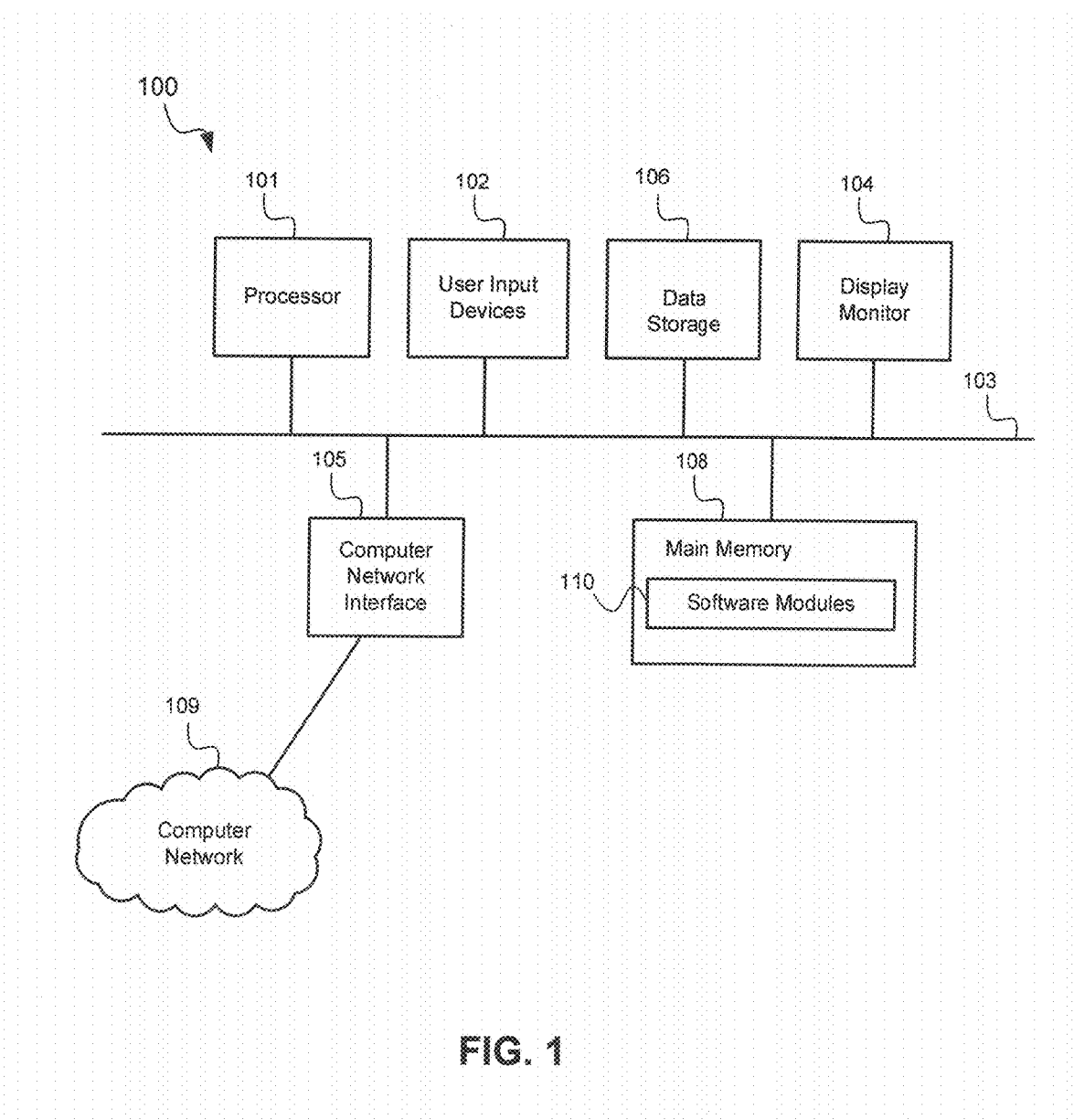
FIG. 1 shows a schematic diagram of a computer system that may be employed with embodiments of the present invention.

Referring now to FIG. 1, there is shown a schematic diagram of a computer system 100 that may be employed with embodiments of the present invention. The computer system 100 may be employed as a client machine or a malware download detection system, for example. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory in the main memory 108 for execution by the processor 101. An article of manufacture may be embodied as computer-readable storage medium including instructions that when executed by the processor 101 of the computer system 100 causes the computer system 100 to be operable to perform the functions of the one or more software modules 110. The software modules 110 may also comprise computer data, such as data structures for a download graph. In the example of FIG. 1, the software modules comprise a download identification agent when the computer system 100 is employed as a client machine. The software modules 110 may comprise a download graph, a URL classifier, and a file classifier when the computer system 100 is employed as a malware download detection system.

Figure 2:
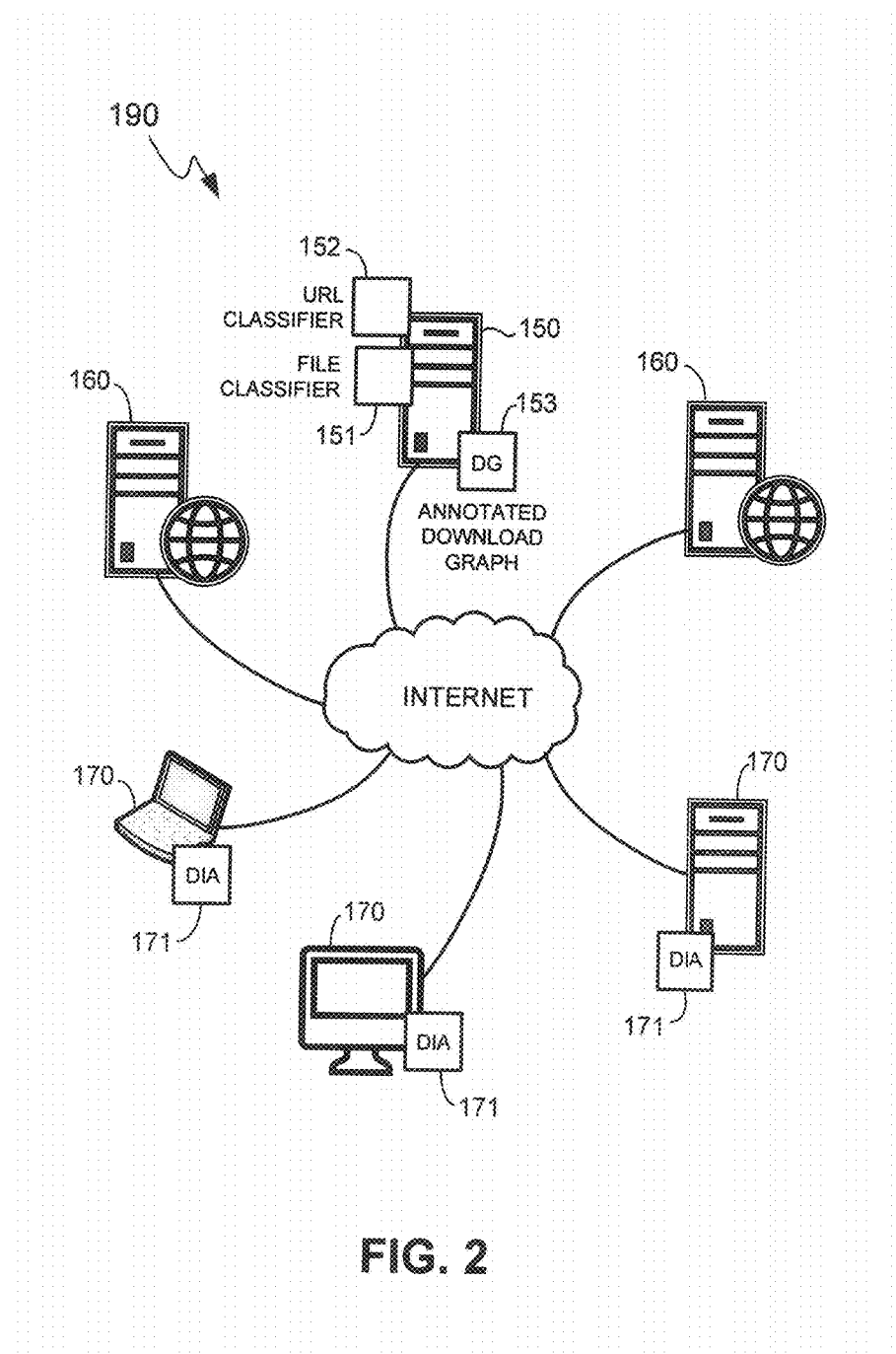
FIG. 2 shows a schematic diagram of a system for protecting computers against remote malware downloads in accordance with an embodiment of the present invention.

FIG. 2 shows a schematic diagram of a system 190 for protecting computers against remote malware downloads in accordance with an embodiment of the present invention. In the example of FIG. 2, the system 190 comprises a malware download detection (MDD) system 150 and a plurality of client computers in the form of client machines 170. The MDD system 150 and the client machines 170 may communicate over the Internet and other computer network.

Generally speaking, malware includes computer viruses, worms, Trojans, rootkits, spyware, and other malicious codes. A client machine 170 may comprise a laptop computer, a tablet, smartphone, desktop computer, or other client computer for downloading a file from a remote file server. A client machine 170 may be infected with malware by downloading the malware from an executable file download server 160. In one embodiment, a download event is characterized as a 3-tuple that identifies the action of a client machine 170 downloading a file from a URL (also referred to as "source URL"). The MDD system 150 may utilize global situation awareness and continuously monitor various network- and system-level events of the client machines 170 across the Internet and provide real time classification of both files and URLs to the client machines 170 upon submission of a new, unknown file or URL to the MDD system 150. The MDD system 150 may detect malware downloads by analyzing who (e.g., client machine) is downloading what (e.g., particular file), and from where (e.g., source URL), rather than by trying to classify the content of an individual downloaded file or a specific download URL in isolation.

In the example of FIG. 2, each participating client machine 170 runs a download identification agent (DIA) 171. The DIA 171 may be configured to detect executable file download events and collect related network- and system-level information of the download events. More particularly, the DIA 171 identifies new executable file download events, i.e., detects when an executable file is downloaded or being downloaded to the client machine 170. The DIA 171 temporarily quarantines the file to prevent the operating system of the client machine 170 from opening or executing the file prior to receiving a decision regarding the nature of the file. The DIA 171 sends information about the download event, also referred to herein as "download event information," to the MDD system 150.

The DIA 171 may collect, and include in the download event information, network-level information, such as the full URL of the source URL, age of the download domain, effective second-level domain of the download domain, etc. The DIA 171 may collect, and include in the download event information, file-related information, such as whether the file is likely packed/obfuscated (e.g., by using an entropy test), whether the file has a valid signature and size, the lifetime of the file (e.g., when the file was observed by any of the DIAs 171), etc. The DIA 171 may also collect, and include in the download event information, system-level information of the client machine 170 that downloaded the file, including the name and hash of the client process that initiated the download, the name of the file as it was first saved on a data storage device, the identity of the client machine 170 (e.g., using a globally unique identifier), whether the client machine 170 had been previously infected with malware, etc.

The DIA 171 may send the download event information and a download classification request to the MDD system 150. In one embodiment, the download classification request is a request to obtain a classification of the file and the source URL, i.e., the URL from which the file was downloaded. The classification may indicate whether the file and/or the URL is malicious, benign (i.e., not malicious), or has an unknown classification. The DIA 171 may permanently block or remove the file when the classification received from the MDD system 150 indicates that either the file or the URL is malicious.

In the example of FIG. 2, the MDD system 150 comprises one or more computers that receive download event information from the plurality of client machines 170, build/update an annotated tripartite download graph 153 from the download event information, and service download classification requests received from the client machines 170. As can be appreciated, the download graph 153 may be represented as data or data structure. In one embodiment, information from the download graph 153 is employed to train and update malware download detection models, which in the example of FIG. 2 comprises a file classifier 151 and a URL classifier 152. The file classifier 151 may comprise a statistical classifier that is configured to classify a downloaded file, and the URL classifier 152 may comprise a statistical classifier that is configured to classify the source URL of the downloaded file. The file classifier 151 and the URL classifier 152 may comprise a Random Forest classifier, for example. A download event may be classified by the MDD system 150 to be malicious when either the downloaded file or its source URL is classified by its corresponding classifier as malicious.

Figure 3:
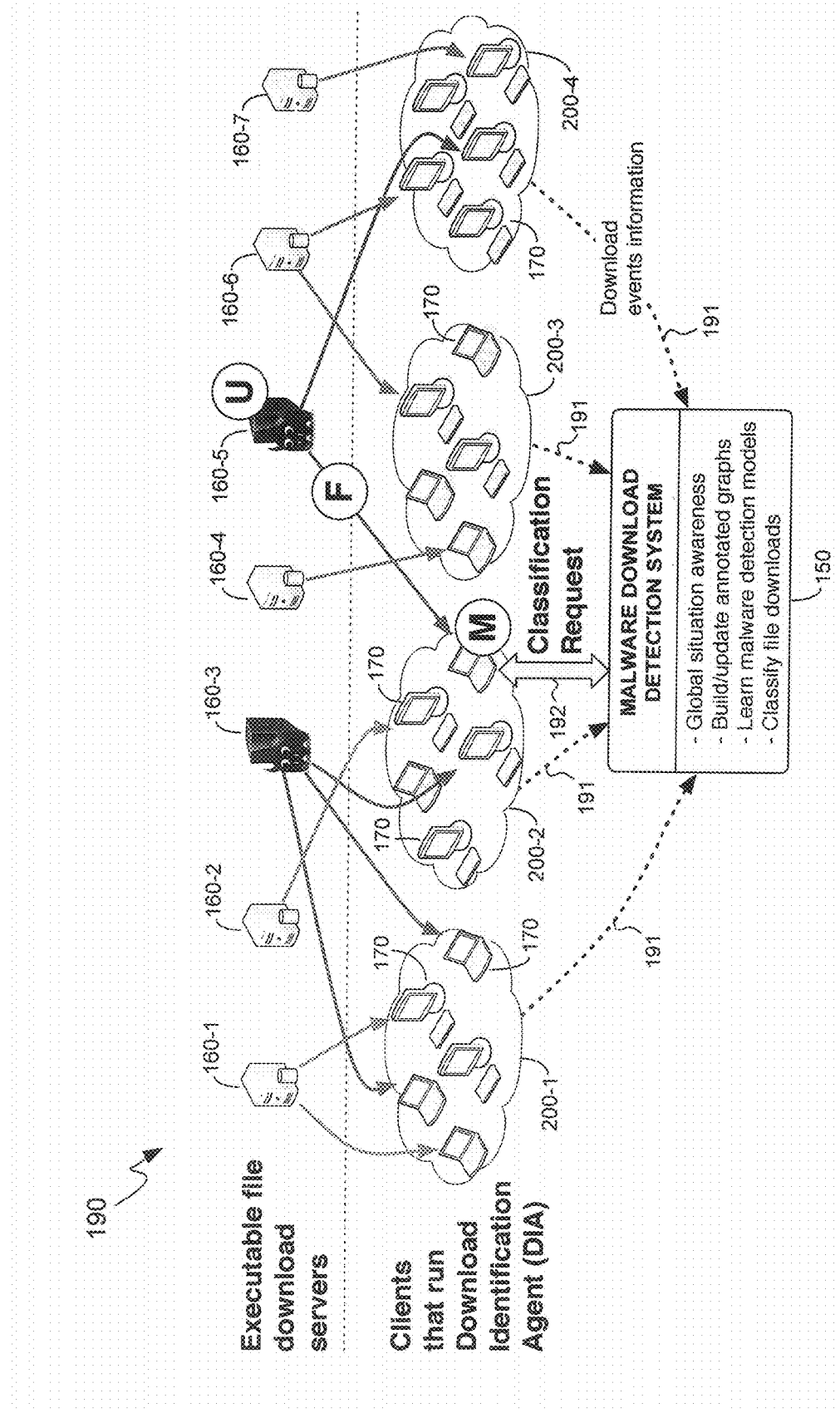
FIG. 3 graphically illustrates an example operation of the system of FIG. 2, in accordance with an embodiment of the present invention.

FIG. 3 graphically illustrates an operation of the system 190, in accordance with an embodiment of the present invention. In the example of FIG. 3, the computer networks 200 (i.e., 200-1, 200-2, 200-3, 200-4) may each comprise a plurality of client machines 170. In FIG. 3, only some of the client machines 170 have reference numerals and the DIA 171 in each of the client machines 170 are not shown for clarity of illustration. In general, a client machine 170 may be represented as a user machine m that at time t downloads an executable file f from a remote download URL u hosted on an executable file download server 160 (i.e., 160-1, 160-2, 160-3, 160-4, 160-5, 160-6, and 160-7). A download server 160, such as the download servers 160-3 and 160-5, may have malicious executable files that may be downloaded to the client machines 170. The system 190 allows for concurrent classification of a file f and a corresponding URL u in real time to determine whether they are likely malicious. In other words, the system 190 allows malware download events to be proactively detected, so that malware files can be immediately quarantined (or removed) to prevent their execution on the client machines 170.

In one embodiment, the system 190 leverages large-scale situation awareness to accurately detect new malware download events in real time. The system 190 continuously monitors system and network events on a large number (e.g., hundreds of thousands) of client machines 170 scattered across the Internet. As explained with reference to FIG. 2, each client machine 170 may run a DIA 171, which recognizes when an executable file download has occurred and reports detailed information about this download event to the centralized MDD system 150. The MDD system 150 collects information about executable file download events from all participating client machines 170 (see arrows 191), automatically updates its malware download detection models, and responds to download classification requests from the client machines 170 (see arrow 192). The MDD system 150 may accurately classify malware download events, and respond to download classification requests from the client machines 170 with minimal response latency.

In the example of FIG. 3, every time a client machine 170 downloads an executable file, the DIA 171 of the client machine 170 reports a corresponding download event information to the MDD system 150. The MDD system 150 uses download event information reported by the DIAs 171 to build an annotated tripartite download graph 153 (see FIG. 2). In one embodiment, the download graph 153 is a directed tripartite graph $\mathcal{G}$ (U, F, M, $E_{U,F}$, $E_{F,M}$, $E_{U,M}$), where nodes in set U represent URLs, nodes in set F represent files, and nodes in set M represent client machines (e.g., client machines 170). The download graph 153 further includes edges $E_{U,F}$ between nodes of URLs and nodes of files, $E_{F,M}$ between nodes of files and nodes of client machines, and $E_{U,M}$ between nodes of URLs and nodes of client machines. The download graph 153 may be represented in memory or other computer-readable storage medium as data or data structures.

In one embodiment, in the download graph 153, each file f in the set F may be uniquely identified by its SHA1 hash and each client machine m in the set M may be identified by an anonymized globally unique identifier (GUID) generated by a corresponding DIA 171. In one embodiment, in the download graph 153, a URL u is connected to a file f with a directed edge (u→f) if f was downloaded from u. Similarly, a file f is connected to a client machine m with a directed edge (f→m), if f was downloaded by m. Finally, a URL u is connected to a client machine m with an edge (u→m) if m downloaded an executable file from u.

In one embodiment, each node of the download graph 153 is annotated with intrinsic node information. For example, each file node f in the set F may include information about whether the file is likely packed/obfuscated, if it carries a valid digital signature, its file size, etc. Similarly, each URL node u in the set U may include information such as the age of the fully qualified and effective second level domains of u, etc., and client machine nodes may carry information related to their malware infection history.

Figure 4:
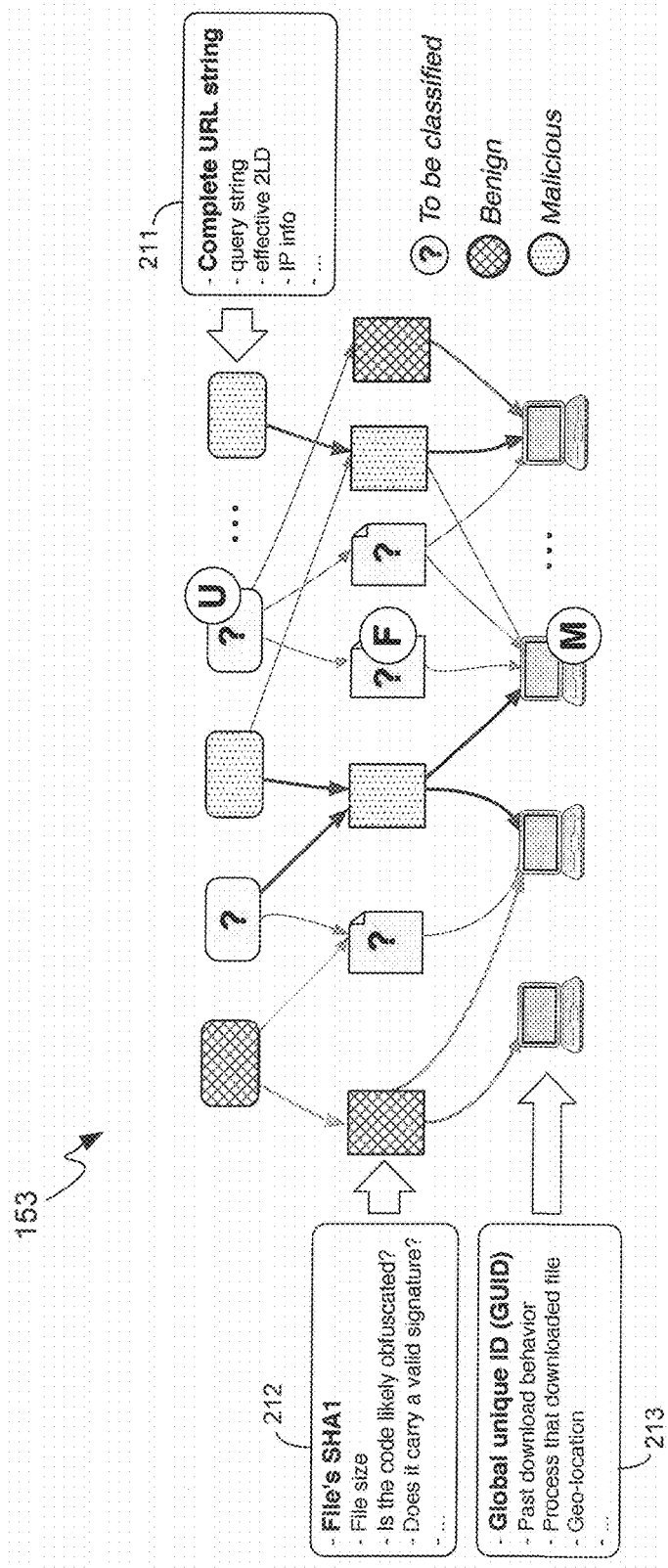
FIG. 4 shows a pictorial representation of an example tripartite download graph in accordance with an embodiment of the present invention.

FIG. 4 shows a pictorial representation of an example tripartite download graph 153 in accordance with an embodiment of the present invention. The download graph 153 of FIG. 4 does not show edges (u→m), i.e., edges between URL nodes and client machine nodes, for simplicity. In the example of FIG. 4, the nodes are labeled to indicate whether a node is benign (represented by cross-hatching), malicious (represented by dots), or has an unknown classification (represented by a question mark). A node may be annotated to include intrinsic information, such as intrinsic information 211 for a URL node, intrinsic information 212 for a file node, and intrinsic information 213 for a client machine node. As will be more apparent below, the classification of an unknown node may be determined based on download graph information (i.e., information available from the download graph 153) of its neighboring nodes.

In one embodiment, the MDD system 150 maintains historic snapshots of the download graph 153, in which known benign and malicious files and URLs are labeled accordingly (e.g., by leveraging existing blacklists, whitelists, and multiple antivirus (AV) engines). The historic information may be used to build one or more statistical classifiers, such as the file classifier 151 and the URL classifier 152, that may be employed to serve classification requests from the DIAs 171.

Figure 5:
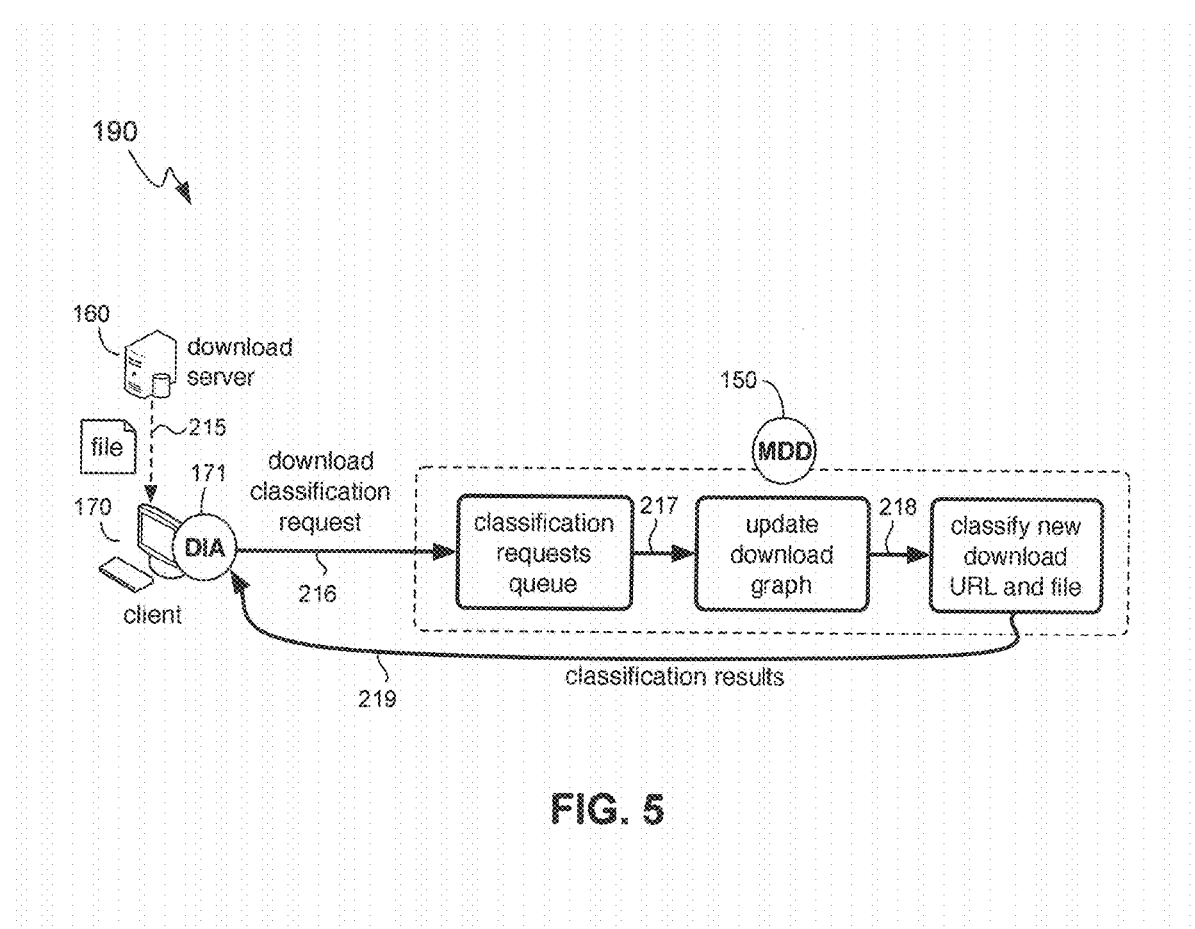
FIG. 5 graphically illustrates another example operation of the system of FIG. 2, in accordance with an embodiment of the present invention.

FIG. 5 graphically illustrates an operation of the system 190 in accordance with an embodiment of the present invention. In the example of FIG. 5, let d'=(u',f',m') be a new download event tuple (e.g., URL, file hash, GUID) reported by a participating DIA 171 to the MDD system 150 (see arrow 216) in response to the file being downloaded by the client machine 170 from the download server 160 (see arrow 215). The reporting of the download event tuple may include a request to classify the file and the URL u'. The MDD system 150 first updates the most recent available download graph 153 snapshot by adding the new download event nodes and related edges to the download graph 153 (see arrow 217). The MDD system 150 uses the updated download graph 153 to concurrently classify u' and f' (i.e., the new URL and file nodes) as either malicious or benign (see arrow 218). If either the URL u' or the file f' is classified as malicious, the related entire download event is classified as malicious and the classification result is forwarded to the requesting DIA 171 (see arrow 219).

In one embodiment, as download events are reported by each DIA 171, the MDD system 150 incrementally builds a tripartite download graph 153 $\mathcal{G}$ ={U, F, M} that expresses the associations among the three entities involved in all download events, namely the source URL, the file downloaded from the source URL, and client machine that downloaded the file from the source URL.

In one embodiment, each node in the download graph 153 may be further augmented with node-specific information. For example, the file nodes in the set F may include file name, size, prevalence (number of times this file was seen during a time window 7), first seen and last seen dates, information about whether the file carries a valid digital signature, who signed the file, and whether the code of the file appear to be packed or obfuscated. The client machine nodes in M may carry information about their download history, the processes that were used to initiate the download events, etc. URL nodes in U may include the IP addresses to which each URL pointed, the fully qualified domain name (FQD) and effective second level domain name (e2LD) of the domain portion of the URL, and a description of the path and query string components of the URL. The "age" or "recency" of the URLs, FQDs, and e2LDs may also be included as properties of each URL node. As a result, the download graph 153 not only encodes the relationships between URLs and files or client machines, but also expresses the relationships between different URL components, files, and client machines. Each download event may also be identified with the timestamp of the event and system-level details related to the process on the client machine that triggered the event, such as the SHA1 hash of the downloading process.

In one embodiment, each node in the download graph 153 is assigned a reputation score. These reputation scores may be utilized to perform inference-based detection of unknown files and URLs based on the associations among the download event entities in the download graph 153. In one embodiment, a node is assigned a badness reputation score $\mathcal{R} \in [0,1]$, where 1 means maximum badness, 0 means maximum goodness, and 0.5 means an unknown node. If a node's badness reputation score is above a badness threshold, the node is labeled as malicious (i.e., known bad), while if the badness reputation score is below the badness threshold, the node is labeled as benign (i.e., known good). In all other cases the node may be labeled as unknown. To calculate and assign badness reputation scores to nodes in the download graph 153, a combination of public and private information for files and URLs, such as files' antivirus scanning labels, URL blacklists, and top domains in an ALEXA INTERNET list, may be leveraged. A client machine node's badness reputation score may be calculated based on its download history, system-level information, and the badness reputation score of its neighbors in the download graph 153.

FIGS. 6A-6D graphically illustrate the relationships between nodes in a tripartite download graph 153 in accordance with an embodiment of the present invention. In the example of FIGS. 6A-6D, the download graph 153 has URL nodes, file nodes, and client machine nodes. Malicious nodes are represented by dots, benign nodes are represented by cross-hatching, and unknown nodes are represented by a question mark. A file node may be identified by the file's SHA1 hash and a client machine node may be identified by the GUID of the client machine.

Figure 6B:
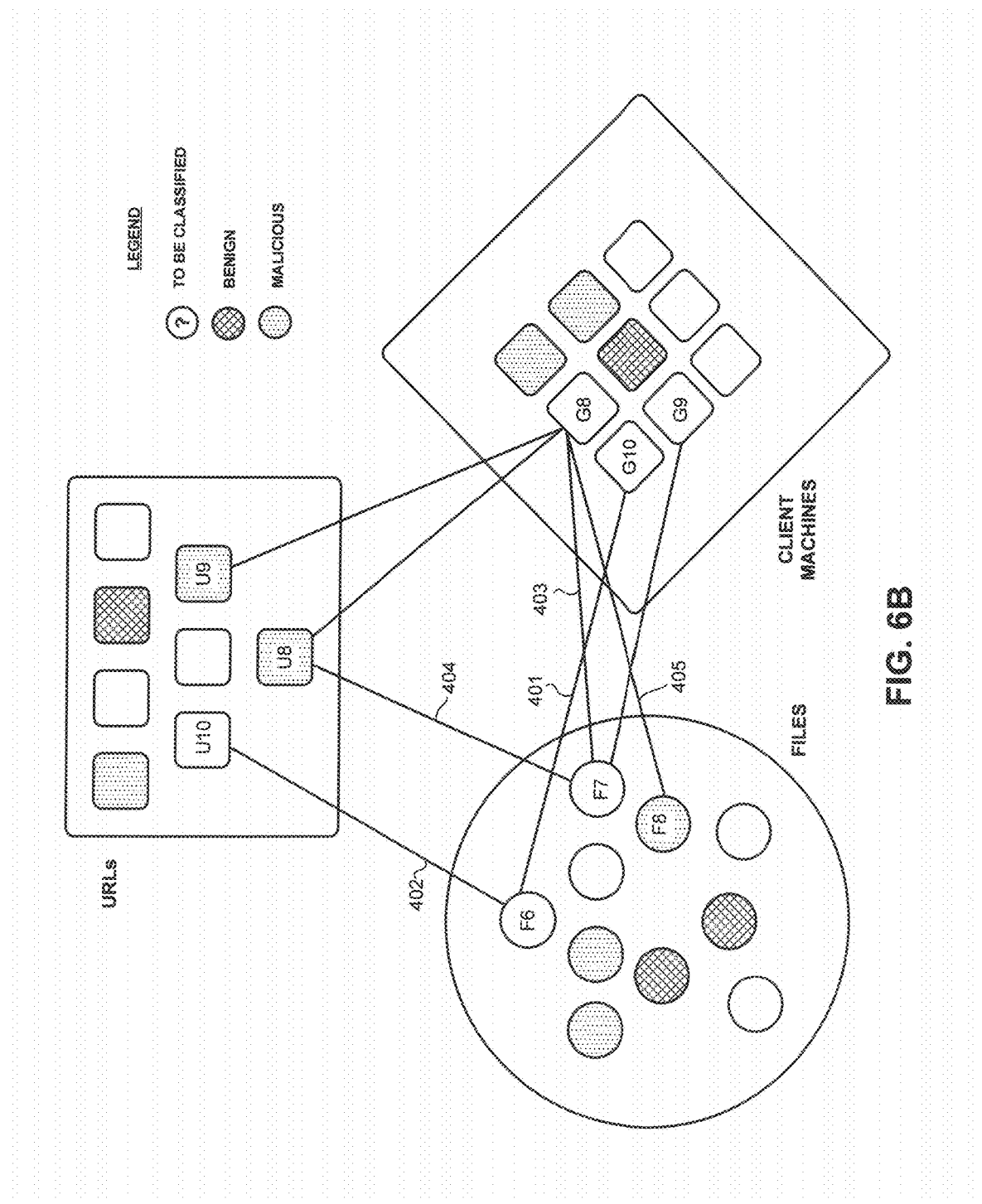

FIG. 6A shows the download graph 153 without the edges between nodes. FIG. 6B shows some of the edges between nodes of the download graph 153. In the example of FIG. 6B, the download graph 153 indicates that a file F6 was downloaded by a client machine G10 (edge 401), the file F6 was downloaded from a URL U10 (edge 402), a file F7 was downloaded by a client machine G8 (edge 403), the file F7 was downloaded from a URL U8 (edge 404), a file F8 was downloaded by the client machine G8 (edge 405), etc. The download graph 153 also labels the classification of a node, such as the URL U8, the URL U9, and the file F8 being malicious.

Figure 6C:
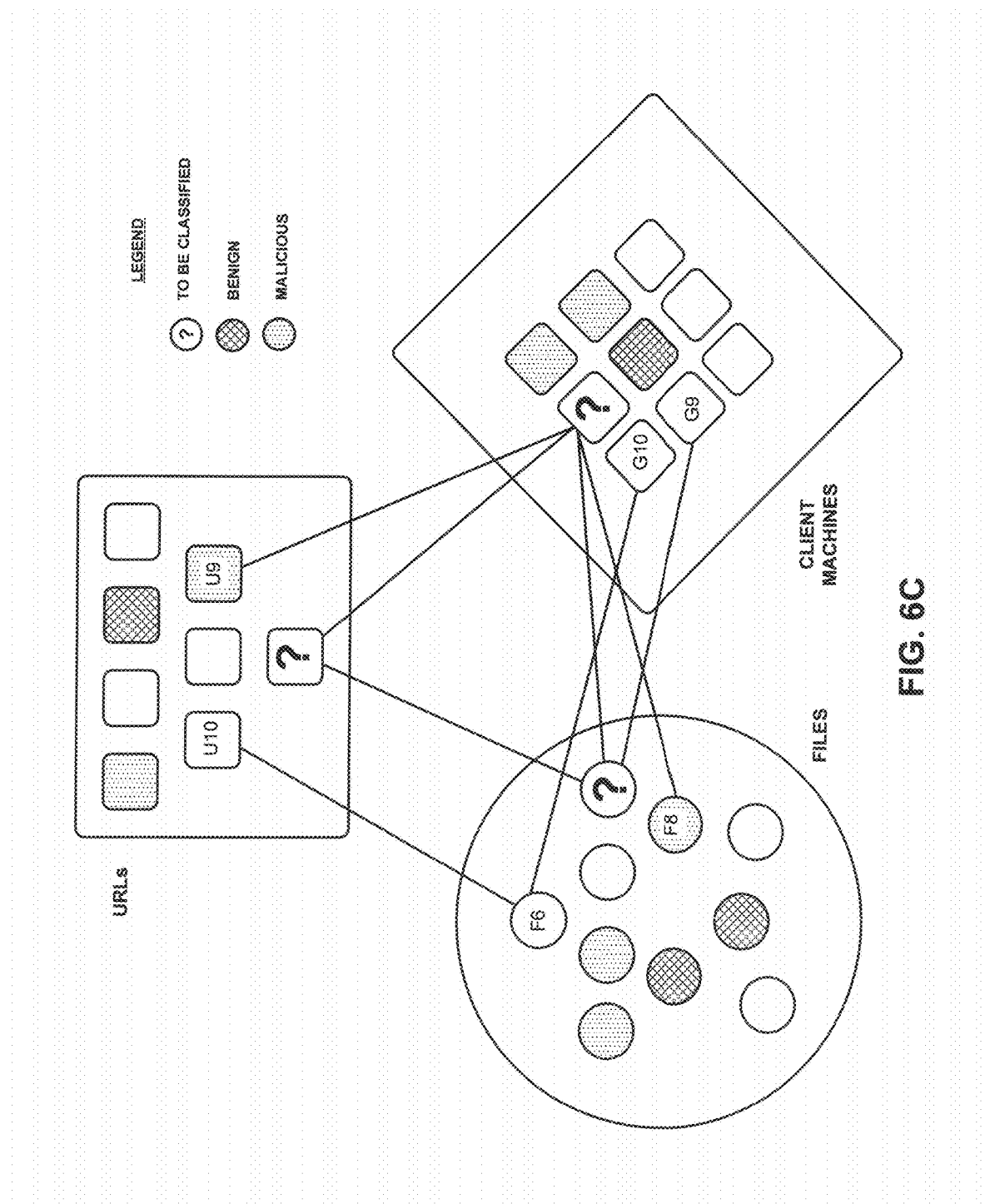
Figure 6D:
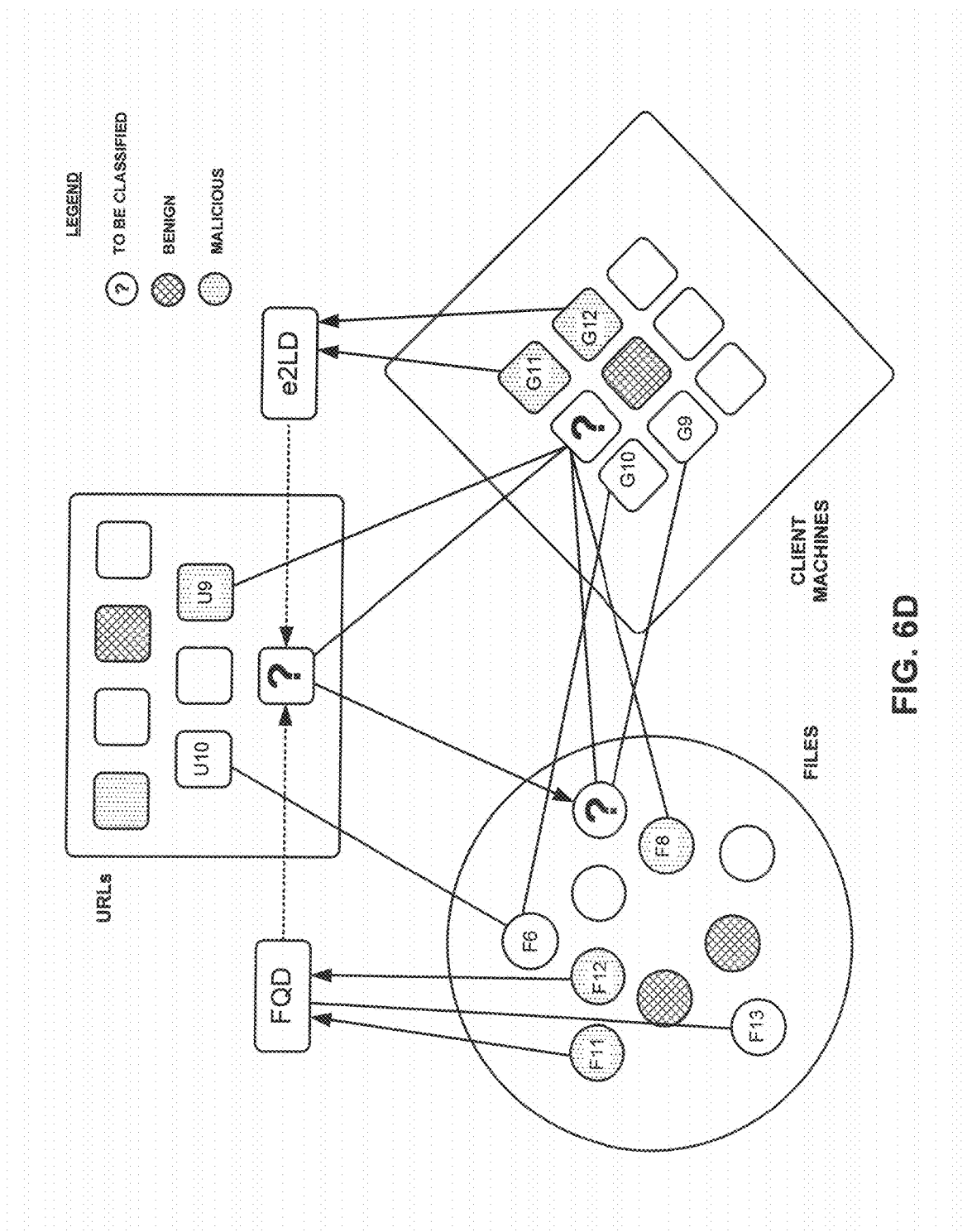

FIG. 6C graphically illustrates a scenario where the classification of some of the nodes are unknown (indicated by a question mark). In that case, additional node relationships may be obtained from the complete URL of a URL node. This is illustrated in FIG. 6D, where the fully qualified domain name (FQD) and the effective second level domain name (e2LD) of a URL node may be employed to link the URL node to known files and client machines, etc. In the example of FIG. 6D, the FQD of the URL node indicates associations with the files F11-F13, and the e2LD of the URL node indicates associations with client machines G11 and G12. More particularly, the e2LD of the URL node indicates that the client machines G11 and G12 have downloaded files from that URL node, and the FQD of the URL node indicates that the files F11, F12, and F13 have been downloaded from the URL node. These previously unknown associations with the URL node are significant in that the files F11 and F12 are malicious, raising the possibility that the URL node is also malicious. The download graph 153 may thus be employed to discover previously unknown associations between URLs, files, and client machines.

The file classifier 151 and the URL classifier 152 may harness behavioral patterns among the nodes in the download graph 153 as well as partially available ground truth from known nodes to detect malware file downloads and malicious URLs. The URL classifier 152 may be configured to distinguish between malicious and benign URLs, and the file classifier 151 may be configured to detect malicious downloaded files. The output of these two statistical classifiers, i.e., the file classifier 151 and the URL classifier 152, may be reconciled as follows: if either the URL or the downloaded file is classified as malicious, then the entire download event is deemed as a malware download.

Each of the file classifier 151 and the URL classifier 152 may receive as input a statistical feature vector for a to-be-classified node, n, and output a badness reputation score. The badness reputation score may be checked against an automatically learned detection threshold to label n. Each of the file classifier 151 and the URL classifier 152 may use a set of statistical features to enable the detection. The statistical features may be divided into two groups: a set of behavioral-based features and a set of intrinsic features. In one embodiment, behavioral-based features are those that describe the goodness or badness of related nodes connected to a to-be-classified node. The behavioral-based features may be determined using the nodes and edges of the download graph 153. The intrinsic features, in contrast, are features that may be determined without using the download graph 153 (e.g., a file's size).

Intrinsic features of files in their node-specific information in the download graph 153 may be used as intrinsic features. For example, the lifetime and prevalence of files are two examples of intrinsic features. Files that have been downloaded into many client machines 170 and were constantly observed by DIAs 171 for long periods of times are most likely benign. In contrast, malwares usually have shorter lifetimes and are downloaded into fewer client machines 170, especially when the impact of packing/obfuscating malware binaries is considered. Additionally, features about whether files are packed or not and if they have a valid signature are also useful intrinsic features. The just-mentioned features are indicative of malware because malwares are often packed to elude detection by antivirus programs, and will not have a valid signature.

Intrinsic features of URLs that may be considered include the age or recency of the URL itself and its FQD and e2LD. Generally, newly registered domains or not-so-popular URLs and domains are more likely associated with malicious content.

In one embodiment, a classifier is not employed to classify client machines. Instead, client machines are employed as a support layer in the download graph 153 to compute the behavioral-based features for the other two layers, namely the URLs and files.

The behavior-based features for nodes in a layer of the download graph 153, e.g. URLs, may be determined based on the badness reputation score, $\mathcal{R}$, of nodes in the other two layers, e.g. files and client machines. That is, all the neighbors of an unknown node n may have some influence in determining the badness reputation of n. If an unknown file f, for example, is downloaded from domains that hosted malware in the past, from URLs with a specific path component that is associated with malicious file downloads, and/or by vulnerable client machines with high badness reputation score g then it is more likely that the unknown file f is itself malicious.

In one embodiment, to compute behavior-based features for a URL, u, first find the set of all files and client machines in the download graph 153 that are connected to u. Let $F_u = \{f_1, f_2, \ldots, f_h\}$ and $M_u = \{m_1, m_2, \ldots, m_k\}$ be sets of files and client machines nodes connected to u, respectively. Then, compute the statistics min, max, average, median, and standard deviation of the following and use these numbers as features of u:

(a) Badness reputation score, $\mathcal{R}$, of all $f_i \epsilon F_u$,
(b) Badness reputation score, $\mathcal{R}$, of all $m_i \epsilon M_u$,
(c) Number of antivirus engines that labeled each $f_i \epsilon F_u$.

In essence, these statistics highlight the true nature of the neighbors of u. If the neighbors of u, in general, have high badness reputation scores, it is more likely that u itself is malicious. Conversely, if on average, the neighbors of u are benign nodes (i.e., clean machines and benign files), then it is likely that u itself is benign.

It is to be noted that direct neighbors of a single URL in the download graph 153 may not give enough information. To gather more information about the URL u, its components, such as FQD, e2LD, path, etc., may be considered. Then, find a set of URLs, $C_u$, that have at least a component in common with u. Finally, gather larger sets of files, $F'_u$, and client machines, $M'_u$, that are connected to URLs in $C_u$ and use them to expand features of u in a similar fashion as nodes in $F_u$ and $M_u$.

Figure 7:
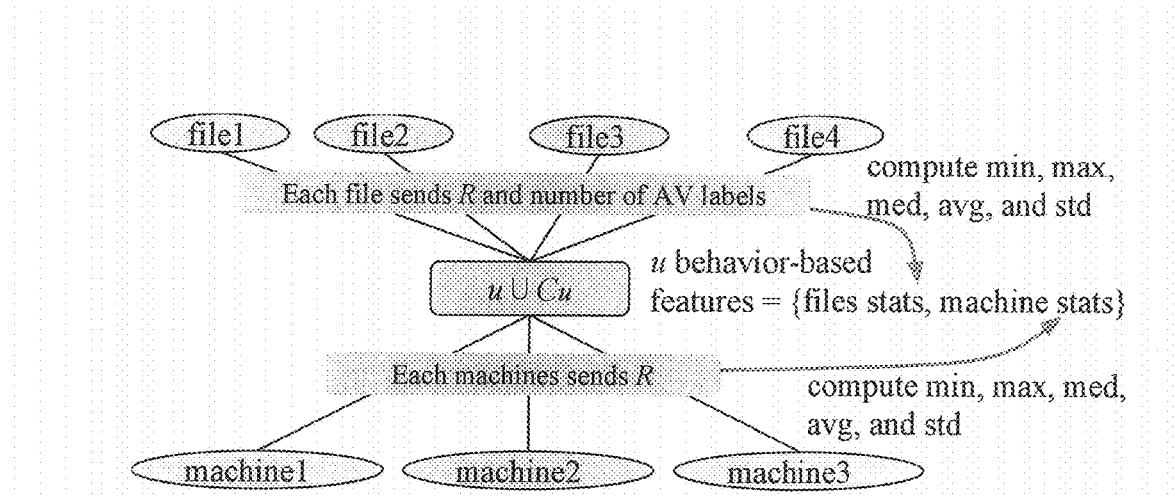
FIG. 7 graphically illustrates how behavior-based features may be computed for a URL, in accordance with an embodiment of the present invention.

FIG. 7 graphically illustrates how behavior-based features may be computed for a URL u, in accordance with an embodiment of the present invention. In FIG. 7, four files, $F_u \cup F'_u$, and three client machines, $M_u \cup M'_u$, are connected to the URL u and URLs in the set of URLs $C_u$ collectively. For ease of illustration, u and $C_u$ are shown in FIG. 7 as one node. Each file and client machine provides some information, shown on edges, to u for behavior-based feature computations. More particularly, FQD, e2LD, path, path pattern, query string, query string pattern, IP, and IP/24 may be considered as components of a URL. In one embodiment, the path pattern is an advanced regular expression for the path of u. To generate the path pattern, sequences of letters, digits, and hexadecimal numbers in a path may be identified and generalized while keeping non-alphanumeric characters. For example, if a path is /sample/123/DA10/install.exe, then the generated path pattern will be /s6/D3/H4/s7.S3, which represents a path with sequences of 6 letters, 3 digits, 4 hexadecimal digits, 7 letters, a '.' and 3 letters. A query string may be defined and generated in a similar fashion from the query string. The IP and IP/24 are the sets of IPs and IP/24 networks that u resolved to during the observation time window.

It is to be noted that the behavior-based features explained above allow for better classification decisions. For example, consider u is an unknown URL and that all of its neighbors are unknown nodes, so they cannot contribute meaningfully to classifying u. Nonetheless, if u shares the same URL path with a group of malicious URLs (because, for example, they were generated by the same malware kit), and if there are some known malware files or infected client machines connected to this group of malicious URLs in the download graph 153, the group of malicious URLs will have an impact on accurately labeling u as malicious, because the badness reputation score $\mathcal{R}$ of the group of malicious URLs will be used to compute some features of u.

As another example, consider the case when path components of some malicious URLs are generated by an algorithm that randomizes characters of the path components to make them look different. Even so, it is likely that the path components share the same path pattern. As a result, if u is an unknown URL with the same path pattern as malicious URLs, then the nodes connected to the malicious URLs, i.e. files and client machines, especially the known malicious ones, are useful in determining the true classification of u. Other components of URLs similarly assist during classification.

Figure 8:
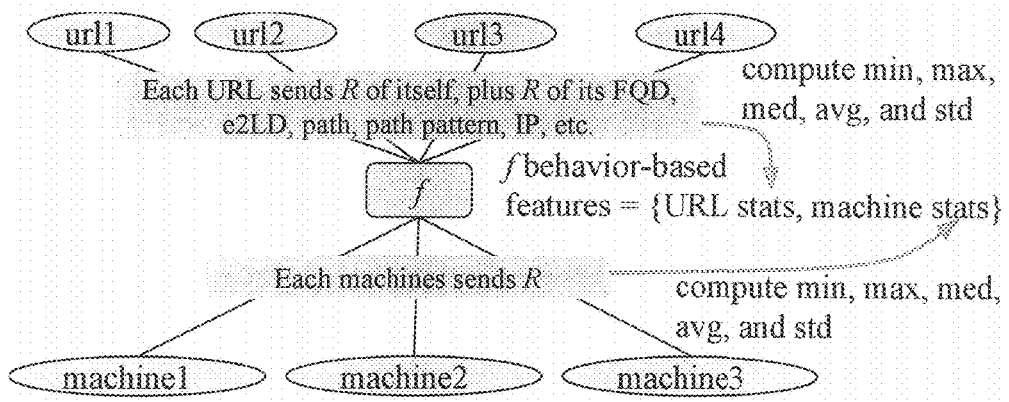
FIG. 8 graphically illustrates how behavior-based features may be computed for a file, in accordance with an embodiment of the present invention.

Behavior-based features of files may be computed in a similar way as behavior-based features of URLs. For example, for a file, f, gather all the connected nodes from URLs and machines layers in the download graph 153 to compute the features of f. FIG. 8 graphically illustrates how behavior-based features may be computed for a file f, in accordance with an embodiment of the present invention. In FIG. 8, the connected nodes from the URLs layer to f also include information about the components of the URL, such as FQDs, e2LDs, path patterns, etc. That is, part of a file's behavior-based features may be statistics of connected URL components to f. Thus, the components of the URLs may also have badness reputation scores ($\mathcal{R}$), since these badness reputation scores may be used to compute behavior-based features of files. To compute the badness reputation score of a component of a URL, such as path pattern, the badness reputation scores of all URLs that share the same component may be averaged.

Nodes of each layer of the download graph 153 may be labeled by assigning them a badness reputation score. The badness reputation score $\mathcal{R}$ may be a real number in the range [0,1] that represents how much evidence exists towards badness or goodness of nodes in the download graph 153. Generally, values closer to $\mathcal{R}=1$ mean high probability of badness (i.e., malicious), values closer to $\mathcal{R}=0$ indicate high goodness possibility (i.e., benign), and $\mathcal{R}=0.5$ means unknown, i.e. no evidence.

Ground truth may be collected for some of the files in the download graph 153 using various sources, such as the VirusTotal scanning service. Classifications and other information from reputable and well-known antivirus companies may also be employed to compute badness reputation scores for files. Publicly-available and/or proprietary lists of known benign files may also be employed to further enhance a file's badness reputation score computation.

In one embodiment, several antivirus vendors that provide reliable results and are well-known and popular according to their market share are identified as trusted antivirus vendors. Confidence in a file being malicious may depend on the number of trusted antivirus vendors that label the file as malicious and, therefore, reflects on the badness reputation score of the file. The more trusted antivirus vendors label a file as malicious, the higher the badness reputation score of the file. A badness reputation score above a certain threshold translates to a malicious label. On the other hand, if no antivirus vendor, either trusted or not, have a malicious label for a file, a low badness reputation score and consequently a benign label may be given to the file.

Ground truth regarding URLs may be obtained by leveraging blacklists and whitelists of URLs and domains. For example, popular domains according to the ALEXA INTERNET list may be used as a white list, and malicious domains according to the GOOGLE SAFE BROWSING service may be used a blacklist. In one embodiment, to minimize noise, domains that consistently appeared in the ALEXA INTERNET list for about a year may be tracked for possible inclusion in a whitelist. Known domains related to cloud storage and those that allow their subdomains to be freely registered, such as web hosting or free blog services and dynamic DNS providers, may be filtered out, as these type of domains may be abused by attackers. URLs having an e2LD that does not appear in the whitelist are also removed. The resulting conservatively filtered whitelist of URLs contains minimal noise. If a URL is found to be in the filtered whitelist, a low badness reputation score, i.e., $\mathcal{R}$, that is close to 0, may be assigned to the URL and the URL will be labeled as benign in the download graph 153. Similarly, a conservative approach may be followed to label malicious URLs. A URL may be assigned a badness reputation score $\mathcal{R}$ close to 1 (maximum badness), if the URL is indicated in the blacklist as malicious. Consequently, that URL will be labeled as malicious in the download graph 153. In one embodiment, to account for possible noise in the blacklist and whitelist, the badness reputation scores of URLs are not an absolute 0 or 1. In other cases, the badness reputation scores of URLs will be a number close to 0.5, and an unknown label may be assigned.

In one embodiment, the computation of reputation for client machines is somewhat different in terms of meaning from files and URLs, as benign and malicious labels for client machines don't necessarily denote good or bad client machines per se. Instead, a malicious label for a client machine indicates that the client machine tends to be more vulnerable to infections, and a benign label for a client machine indicates that the client machine does not appear to be associated with malicious content based on the client machine's history.

In one embodiment, the behavioral history of client machines is combined with system level information collected by the DIAs to compute the badness reputation score of the client machines as follows. For each client machine, in a time window, the history of the client machine's activities, including downloaded files, visited URLs, and client processes that initiated the downloads are considered. Because all of these entities in the client machine's activity history are assigned badness reputation scores, their badness reputation scores may be averaged and used as the badness reputation score of the client machine. The rationale being that if a client machine, during a time period, does not download bad files, contact bad URLs, or run bad processes, it is likely that the client machine is a clean, i.e., benign. On the other hand, a client machine may be assigned a high badness reputation score if the client machine downloaded enough bad files, contacted some bad URLs, or executed malware. In that case, the client machine may be labeled as malicious because the client machine is likely to be vulnerable and will access malicious content again in the future.

Figure 9:
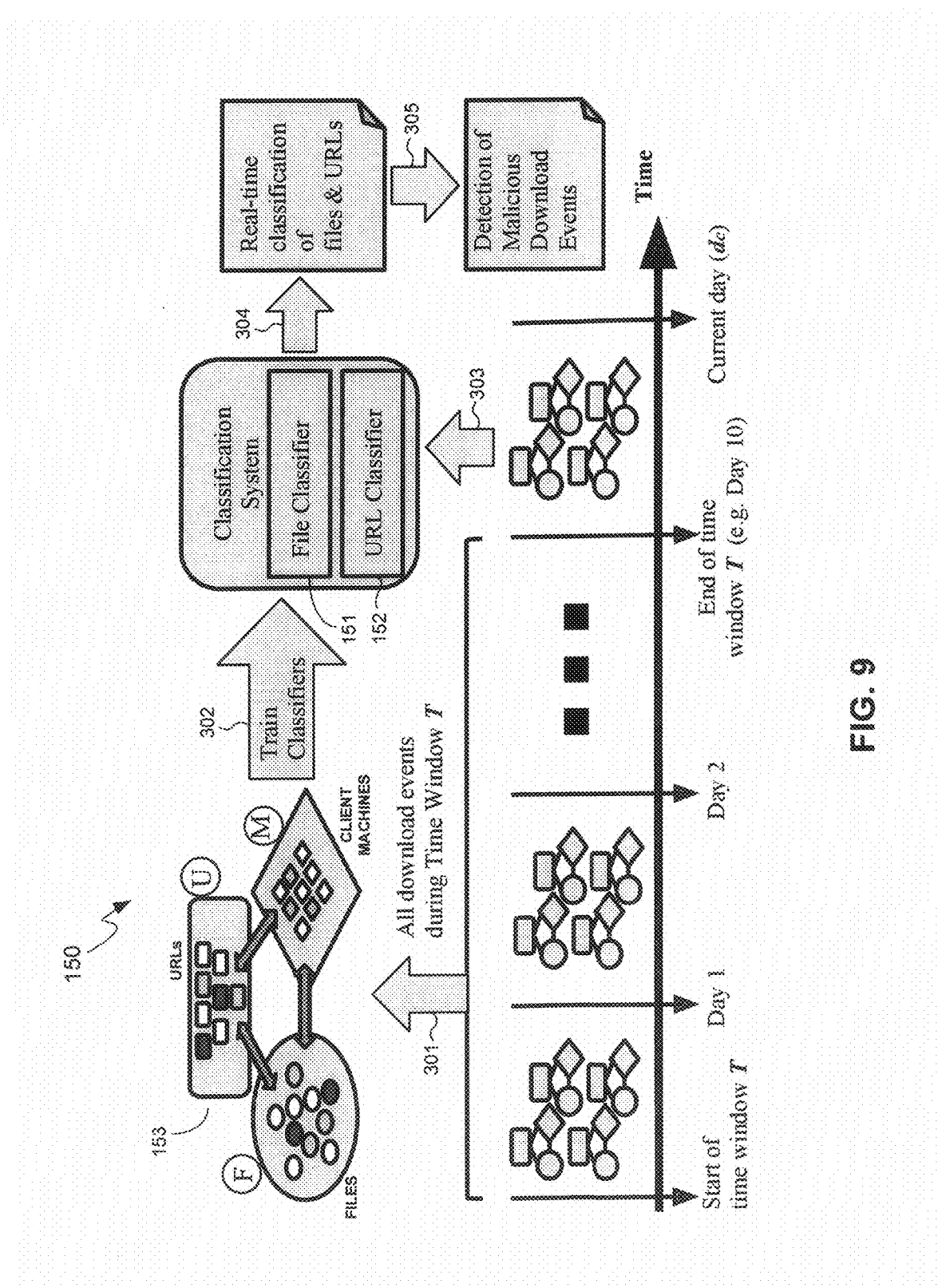
FIG. 9 graphically illustrates an example operation of a malware download detection system, in accordance with an embodiment of the present invention.

FIG. 9 graphically illustrates an operation of the MDD system 150, in accordance with an embodiment of the present invention. In one embodiment, the MDD system 150 provides real-time classification results for files and URLs observed by DIAs 171 running on participating client machines 170. By combining the classification results of files and URLs, the MDD system 150 allows for classification of the entire download event, d=(u,f,m), 3-tuples of URLs, files, and machines.

In one embodiment, the MDD system 150 automatically classifies new files and new URLs on the current day by harnessing historical knowledge gathered from current and previous days within a time window T. In one embodiment, the historical knowledge is from a tripartite download graph 153 that associates the items of download events together where nodes are assigned badness reputation scores. The MDD system 150 may keep a sliding window over all the download events and set T (e.g., 10 days). In FIG. 9, the beginning of T is set to 10 days before the start of current day, $d_c$. FIG. 9 graphically shows the MDD system 150 keeping a sliding window over all the download events (depicted by 3 connected shapes, which are a circle, a rectangle and a diamond, representing files, URLs, and client machines, respectively) during T and using them to generate the download graph 153 (FIG. 9, arrow 301) and train the classifiers 151 and 152 (FIG. 9, arrow 302).

In one embodiment, the MDD system 150 classifies all unknown nodes observed on the current day $d_c$ using the download graph 153 that is generated by considering all download events during T. For any unknown node in $d_c$, its feature vector may be computed and input to a corresponding classifier (FIG. 9, arrow 303), i.e., the feature vector of an unknown file may be input to the file classifier 151 and the feature vector of an unknown URL may be input to the file classifier 152. The classifier, in response, produces a detection score that may be compared against a previously learned detection threshold (FIG. 9, arrow 304). If the produced detection score is above the detection threshold, the unknown node may be labeled as malicious. By combining the classification results for files and URLs, malicious download events d=(u,f,m) may be detected (FIG. 9, arrow 305), where either u or f is classified as malicious by either classifier.

Knowledge from previous days during T in the download graph 153 may be used to prepare training datasets of known files and URLs for training the file classifier 151 and the URL classifier 152. For example, the training dataset for the file classifier 151 may include labeled feature vectors for all known benign and malicious file nodes in the download graph 153 during the training time window T.

For known file and URL nodes that are used for training, part of their behavior-based features may be based on the badness reputation scores of client machines connected to them. However, the badness reputation scores of client machines may have been computed according to the files and URLs that are connected to them in the first place. This may adversely result in what is referred to in the art of machine learning as "information leakage." In one embodiment, to resolve this issue and in order to compute behavior-based features for a known node, n, to be included in the training dataset, recompute the badness reputation scores of the client machines connected to n while ignoring the true badness reputation score of n temporarily by replacing the badness reputation score, $\mathcal{R}$, of n with 0.5. This way, the true nature of n will not have any effect on the badness reputation scores of the client machines because the value of 0.5 was used as the badness reputation score of n. This replicates the real-world operation of the system when an unknown node's $\mathcal{R}$ =0.5 is used to compute the badness reputation scores of the connected client machines. Conservatively, to compute behavior-based features of a URL, u, the badness reputation score of u may be actually replaced with the badness reputation score of any URL with the same e2LD as u from the connected client machines; the badness reputation scores of the connected client machines may thereafter be recomputed.

Figure 10:
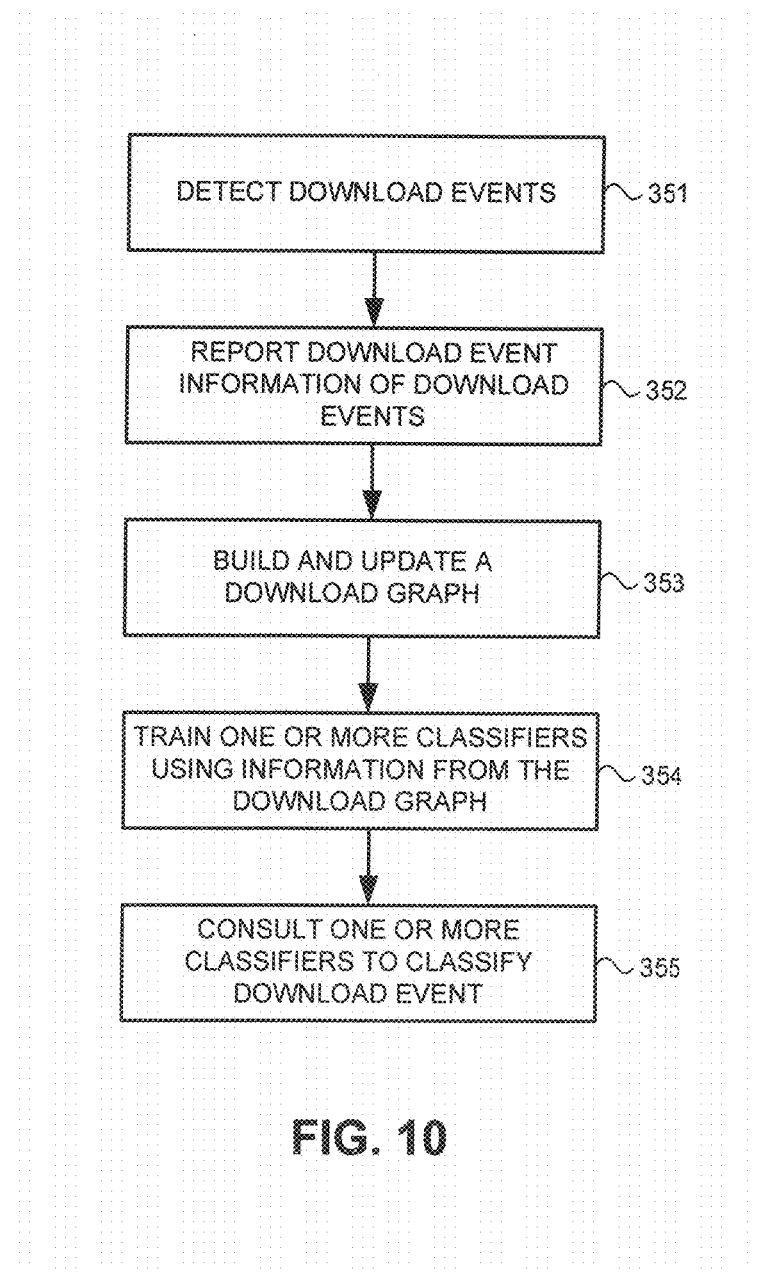
FIG. 10 shows a flow diagram of a computer-implemented method of protecting computers against remote malware downloads in accordance with an embodiment of the present invention.

FIG. 10 shows a flow diagram of a computer-implemented method of protecting computers against remote malware downloads in accordance with an embodiment of the present invention. The method of FIG. 10 may be performed using components of the system 190 of FIG. 2. As can be appreciated, other components may also be employed without detracting from the merits of the present invention. In the example of FIG. 10, the steps 351 and 352 may be performed by a plurality of client computers (e.g., client machines 170), and the steps 353-355 may be performed by a malware download detection system (e.g., MDD system 150).

In the example of FIG. 10, participating client computers detect download events (step 351). A download event may involve a client computer downloading a file from a network address (e.g., URL) of a remote download server. The client computer may quarantine the file to prevent the file from executing before the download event has been classified. The client computer reports the download event by sending a corresponding download event information to a malware download detection system over the Internet (step 352). The download event information may be a 3-tuple comprising an identifier of the file (e.g., SHA1 hash of the file), an identifier of the client computer (e.g., GUID), and the network address (e.g., complete URL) from which the file was downloaded.

The malware download detection system uses download event information received from the participating client computers to build and update a download graph (step 353). In one embodiment, the download graph is an annotated tripartite download graph (e.g., download graph 153) that includes a set of nodes that represent downloaded files, a set of nodes that represent client computers, and a set of nodes that represent network addresses. The nodes of the download graph may be annotated to include additional information (e.g., intrinsic information) and may be labeled to indicate a classification (e.g., malicious, benign, or unknown). An unknown node may be classified based on classification and annotated information of its neighboring nodes. The malware download detection system may train one or more classifiers (e.g., classifier 151 and a URL classifier 152) using information from the download graph (step 354). The malware download detection system may consult the one or more classifiers to classify a download event (arrow 355). In one embodiment, the malware download detection system classifies a download event by concurrently classifying a file and a network address from which the file was downloaded involved in the download event. A download event may be classified as malicious if either the file or the network address is classified as malicious. The malware download detection system may provide the result of the classification to the client computer that requested classification of the download event.

Systems and methods for protecting computers against remote malware downloads have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:
   detecting a download event in a client computer, the download event involving download of a file into the client computer;
   forwarding a download event information from the client computer to a malware download detection system, the download event information comprising a source uniform resource locator (URL) from which the file was downloaded by the client computer, an identifier of the client computer, and an identifier of the file;
   performing, by the malware download detection system, the steps of:
      updating a download graph using the download event information,
      training one or more classifiers using information from the download graph,
      consulting the one or more classifiers to concurrently classify the file and the source URL,
      classifying the download event as malicious if either the file or the source URL is classified as malicious, and
      providing the client computer a result of classifying the download event,
      wherein the download graph comprises a tripartite download graph, and wherein the download graph further comprises a set of nodes of source URLs, a set of nodes of client computers that provide download event information to the malware download detection system, and a set of nodes of files; and
   preventing execution of the file at the client computer upon receiving from the malware download detection system the result indicating the download event is malicious.

2. The computer-implemented method of claim 1, further comprising:
   forwarding from the malware download detection system to the client computer a result of classifying the download event.

3. The computer-implemented method of claim 2, further comprising:
   quarantining the file to prevent the file from being executed before receiving the result of classifying the download event in the client computer.

4. The computer-implemented method of claim 1, wherein each file in the set of nodes of files is identified by a hash.

5. The computer-implemented method of claim 4, wherein the hash comprises a Secure Hash Algorithm 1 (SHA1).

6. The computer-implemented method of claim 1, wherein each client computer in the set of nodes of client computers is identified by a globally unique identifier (GUID).

7. A system comprising:
   a plurality of client computers, and
   a malware download detection system;
   each client computer of the plurality of client computers, comprising one or more hardware processor, is configured to:
      detect a download event involving download of a file into the client computer,
      forward, from the client computer to the malware download detection system, a download event information comprising a source uniform resource locator (URL) from which the file was downloaded by the client computer, an identifier of the client computer, and an identifier of the file;
   the malware download detection system, comprising one or more computers, is configured to:
      update a download graph using download event information received from the plurality of client computers,
      train one or more classifiers using information from the download graph,
      consult the one or more classifiers to classify the file and the source URL,
      classify the download event as malicious if either the file or the source URL is classified as malicious, and
      provide the client computer a result of classifying the download event,
      wherein the download graph comprises a tripartite download graph, and wherein the download graph further comprises a set of nodes of source URLs, a set of nodes of the plurality of client computers, and a set of nodes of files; and
   each client computer of the plurality of client computers further configured to:
      preventing execution of the file at the client computer upon receiving from the malware download detection system the result indicating the download event is malicious.

8. The system of claim 7, wherein the client computer is further configured to quarantine the file to prevent the file from being executed before receiving the result of classifying the download event in the client computer.

9. The system of claim 7, wherein each file in the set of nodes of files is identified by a hash.

10. The system of claim 9, wherein the hash comprises a Secure Hash Algorithm 1 (SHA1).

11. The system of claim 7, wherein the plurality of client computers are each identified by a globally unique identifier (GUID).

12. A non-transitory computer-readable storage medium comprising instructions stored thereon, that when executed by a processor, perform the steps of:

detecting a download event in a client computer, the download event involving download of a file into the client computer;

forwarding a download event information from the client computer to a malware download detection system, the download event information comprising a source uniform resource locator (URL) from which the file was downloaded by the client computer, an identifier of the client computer, and an identifier of the file;

performing, by the malware download detection system, the steps of:

updating a download graph using the download event information, training one or more classifiers using information from the download graph, consulting the one or more classifiers to concurrently classify the file and the source URL, classifying the download event as malicious if either the file or the source URL is classified as malicious, and providing the client computer a result of classifying the download event, wherein the download graph comprises a tripartite download graph, and wherein the download graph further comprises a set of nodes of source URLs, a set of nodes of client computers that provide download event information to the malware download detection system, and a set of nodes of files; and preventing execution of the file at the client computer upon receiving from the malware download detection system the result indicating the download event is malicious.

* * * * *